United States Patent
Lai

(10) Patent No.: US 11,807,364 B2
(45) Date of Patent: Nov. 7, 2023

(54) METHOD AND DEVICE FOR DETERMINING ABNORMALLY MOUNTED PROPELLER IN UNMANNED AERIAL VEHICLE (UAV)

(71) Applicant: SZ DJI TECHNOLOGY CO., LTD., Shenzhen (CN)

(72) Inventor: Zhenzhou Lai, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 23 days.

(21) Appl. No.: 17/719,368

(22) Filed: Apr. 13, 2022

(65) Prior Publication Data
US 2022/0234734 A1 Jul. 28, 2022

Related U.S. Application Data

(63) Continuation of application No. PCT/CN2019/120297, filed on Nov. 22, 2019.

(51) Int. Cl.
*B64C 39/02* (2023.01)
*G08G 5/00* (2006.01)
*B64U 30/20* (2023.01)

(52) U.S. Cl.
CPC ......... *B64C 39/024* (2013.01); *G08G 5/0069* (2013.01); *B64U 30/20* (2023.01); *B64U 2201/20* (2023.01)

(58) Field of Classification Search
CPC .... B64C 39/024; G08G 5/0069; B64U 30/20; B64U 2201/20
See application file for complete search history.

(56) References Cited

FOREIGN PATENT DOCUMENTS

| CN | 108473197 A | 8/2018 |
|---|---|---|
| JP | H06255594 A | 9/1994 |
| JP | 2006082775 A | 3/2006 |
| JP | 2017132378 A | 8/2017 |
| WO | 2010128489 A3 | 1/2011 |
| WO | 2014198642 A1 | 12/2014 |

OTHER PUBLICATIONS

The World Intellectual Property Organization (WIPO) International Search Report for PCT/CN2019/120297 dated Aug. 19, 2020 3 Pages.

*Primary Examiner* — Alan D Hutchinson
(74) *Attorney, Agent, or Firm* — Anova Law Group, PLLC

(57) ABSTRACT

A method for an unmanned aerial vehicle (UAV) includes: generating a control signal that controls multiple motors of the UAV each configured to drive a corresponding one of multiple propellers. The multiple propellers are configured to be mounted at the multiple motors, respectively. The control signal includes at least one of an idling control signal or a takeoff control signal. The method also includes: controlling the multiple motors to operate based on the control signal; obtaining status information of the UAV when the multiple motors are operating in response to the control signal; and determining whether at least one of the multiple propellers is abnormally mounted according to the status information.

20 Claims, 6 Drawing Sheets

METHOD AND DEVICE FOR DETERMINING ABNORMALLY MOUNTED PROPELLER IN UNMANNED AERIAL VEHICLE (UAV)

CROSS-REFERENCE TO RELATED APPLICATION

This application is a continuation of International Application No. PCT/CN2019/120297, filed Nov. 22, 2019, the entire content of which is incorporated herein by reference.

TECHNICAL FIELD

The present disclosure relates to unmanned aerial vehicle (UAV) technologies and, more particularly, to a method and device for determining abnormally-mounted propeller(s) in a UAV.

BACKGROUND

To prevent takeoff failure caused by abnormally functioned motors/actuators, some UAVs have an identifier configured at its motor to remind users to correctly install a corresponding propeller onto the motor. For example, circle signs can be printed on some motors of a UAV, and only propellers also printed with circles should be mounted at these motors to achieve a correct installation. However, such configuration only serves as a reminding note and relies heavily on users' familiarity with the UAV. A user may still install a propeller onto a mismatched motor and cause UAV operation failure. Existing technologies do not provide strategies to actively detect whether the propeller is correctly mounted. Thus, there is a need for developing a technique for intelligent detection of abnormally mounted propellers in UAVs.

SUMMARY

In accordance with the present disclosure, there is provided a method for an unmanned aerial vehicle (UAV). The method includes: generating a control signal that controls multiple motors of the UAV each configured to drive a corresponding one of multiple propellers. The multiple propellers are configured to be mounted at the multiple motors, respectively. The control signal includes at least one of an idling control signal or a takeoff control signal. The method also includes: controlling the multiple motors to operate based on the control signal; obtaining status information of the UAV when the multiple motors are operating in response to the control signal; and determining whether at least one of the multiple propellers is abnormally mounted according to the status information.

Also in accordance with the present disclosure, there is provided an apparatus for a UAV. The apparatus includes a memory and a processor coupled to the memory. The processor is configured to generate a control signal that controls multiple motors of the UAV each configured to drive a corresponding one of multiple propellers. The multiple propellers are configured to be mounted at the multiple motors, respectively. The control signal includes at least one of an idling control signal or a takeoff control signal. The processor is also configured to: control the multiple motors to operate based on the control signal; obtain status information of the UAV when the multiple motors are operating in response to the control signal; and determine whether at least one of the multiple propellers is abnormally mounted according to the status information.

Also in accordance with the present disclosure, there is provided a method for a UAV. The method includes: generating, before the UAV takes off, a control signal that controls multiple motors of the UAV each configured to drive a corresponding one of multiple propellers. The multiple propellers are configured to be mounted at the multiple motors, respectively. The method also includes: controlling the multiple motors to operate based on the control signal; obtaining status information of the UAV when the multiple motors are operating in response to the control signal; and determining whether at least one of the multiple propellers is abnormally mounted according to the status information.

Also in accordance with the present disclosure, there is provided an apparatus for a UAV. The apparatus includes a memory and a processor coupled to the memory. The processor is configured to generate, before the UAV takes off, a control signal that controls multiple motors of the UAV each configured to drive a corresponding one of multiple propellers. The multiple propellers are configured to be mounted at the multiple motors, respectively. The processor is also configured to: control the multiple motors to operate based on the control signal; obtain status information of the UAV when the multiple motors are operating in response to the control signal; and determine whether at least one of the multiple propellers is abnormally mounted according to the status information.

DESCRIPTION OF THE EMBODIMENTS

Hereinafter, embodiments consistent with the disclosure will be described with reference to the drawings, which are merely examples for illustrative purposes and are not intended to limit the scope of the disclosure. Wherever possible, the same reference numbers will be used throughout the drawings to refer to the same or like parts.

An unmanned aerial vehicle (UAV) includes multiple propellers configured to be mounted on respective motors. Before operating the UAV to move, a user may install/mount multiple propellers onto the UAV. A part or all of the multiple propellers may be abnormally mounted. An abnormally-mounted propeller, as used herein, may refer to absence of propeller at a motor, a propeller that is not securely/properly tightened on to the corresponding motor, and/or a propeller not mounted with intended rotation direction/orientation. Abnormally-mounted propeller(s) can undermine UAV operation safety and damage user experience. The present disclosure provides a method and apparatus for determining abnormally-mounted propeller(s) in a UAV, thereby promoting safe operation of the UAV and ensuring safety of the user.

Figure 1A:
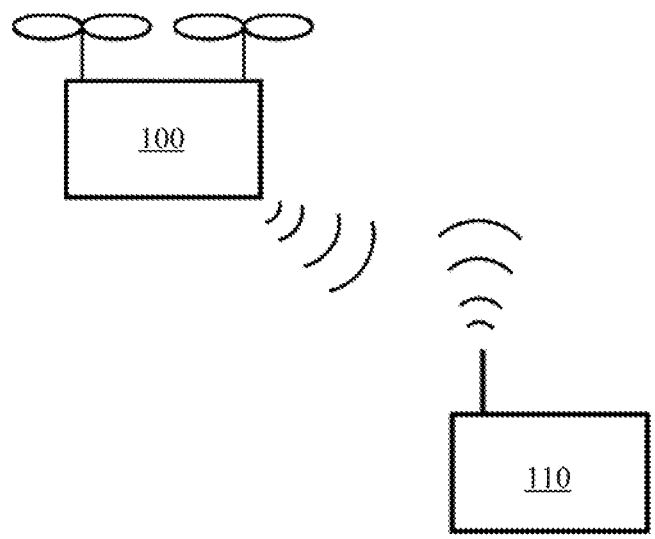
FIG. 1A is a schematic diagram showing an operating environment according to an exemplary embodiment of the present disclosure.

FIG. 1A is a schematic block diagram showing an operating environment according to exemplary embodiments of the present disclosure. As shown in FIG. 1A, a UAV 100 may communicate with a remote control 110 wirelessly. The remote control 110 may be a remote controller coupled to the UAV 110 or a terminal device with an application (app) that can control the UAV 100. The terminal device can be, for example, a smartphone, a tablet, a game device, or the like. The UAV 102 can carry a camera 1022. Safety information of the UAV 100 such as a mounting abnormality notice may be transmitted to the remote control 110 and displayed on a screen coupled to the remote control 110. The screen coupled to the remote control 110, as used herein, may refer to a screen embedded with the remote control 110, and/or a screen of a display device operably connected to the remote control 110. The display device can be, for example, a smartphone or a tablet. The UAV 100 may receive and carry out an operation command (e.g., a takeoff instruction) from the remote control 110. One or more processors onboard and/or offboard the UAV 100 (e.g., a processor on a UAV 100 and/or a processor in the remote control 110) are configured to implement a safety protection logic to the flight control system of the UAV by, for example, determining whether at least one of the multiple propellers is abnormally mounted and enter safe mode when detecting at least one abnormally-mounted propeller.

Figure 1B:
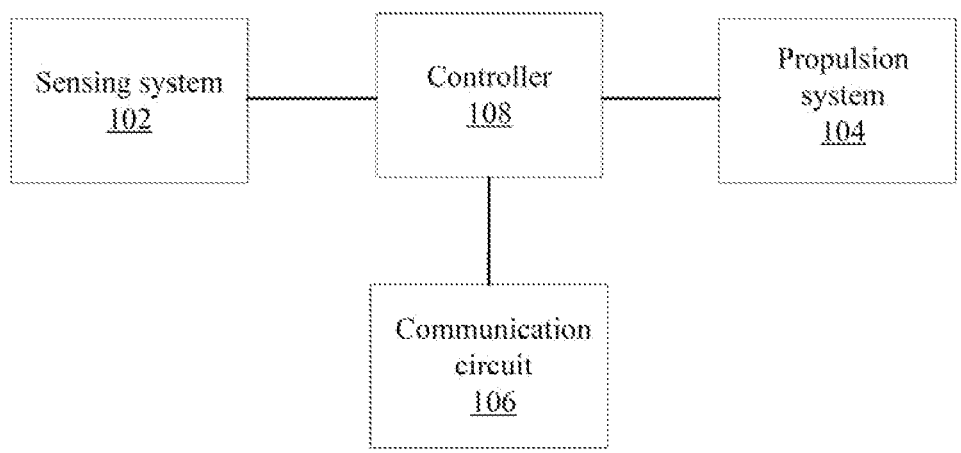
FIG. 1B is a schematic block diagram of an unmanned aerial vehicle (UAV) according to an exemplary embodiment of the present disclosure.

FIG. 1B is a schematic block diagram of a UAV according to exemplary embodiments of the present disclosure. As shown in FIG. 1B, UAV 100 may include a sensing system 102, a propulsion system 104, a communication circuit 106, and an onboard controller 108.

The propulsion system 104 may be configured to enable the UAV 100 to perform a desired movement (e.g., in response to a control signal from the onboard controller 108 and/or the remote control 110), such as taking off from or landing onto a surface, ascending/descending to a certain altitude, etc. The propulsion system 104 may include one or more of any suitable propellers, blades, rotors, motors, engines and the like to enable movement of the UAV 100. The communication circuit 106 may be configured to establish wireless communication and perform data transmission with the remote control 110. The transmitted data may include sensing data and/or control data. The onboard controller 108 may be configured to control operation of one or more components (e.g., a motor, an indicator light, etc.) on board the UAV 100 (e.g. based on analysis of sensing data from the sensing system 102) or an external device in communication with the UAV 100.

The sensing system 102 can include one or more sensors that may sense the spatial disposition, velocity, and/or acceleration of the UAV 100 (e.g., an attitude of the UAV 100 with respect to up three degrees of rotation, such as pitch, yaw, and roll). Examples of the sensors may include but are not limited to: location sensors (e.g., global positioning system (GPS) sensors, mobile device transmitters enabling location triangulation), image sensors (e.g., imaging devices capable of detecting visible, infrared, and/or ultraviolet light, such as a camera), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and/or combination of sensors can be included in the sensing system 102. Sensing data collected and/or analyzed by the sensing system 102 can be used to control the spatial disposition, velocity, and/or orientation of the UAV 100 (e.g., using a suitable processing unit such as the onboard controller 108 and/or the remote control 110).

Figure 2:
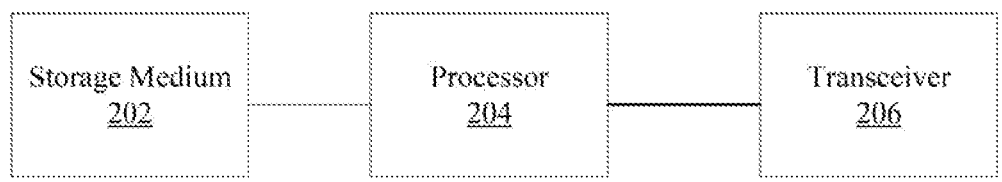
FIG. 2 is a schematic block diagram showing a computing device according to an exemplary embodiment of the present disclosure.

FIG. 2 is a schematic block diagram showing a computing device 200 according to an exemplary embodiment of the present disclosure. The computing device 200 may be implemented in the UAV 100 and/or the remote control 110, and can be configured to perform a method for detecting abnormally mounted propeller and for implementing safe operation logic consistent with the disclosure. As shown in FIG. 2, the computing device 200 includes at least one processor 204, at least one storage medium 202, and at least one transceiver 206. According to the disclosure, the at least one processor 204, the at least one storage medium 202, and the at least one transceiver 206 can be separate devices, or any two or more of them can be integrated in one device.

The at least one storage medium 202 can include a non-transitory computer-readable storage medium, such as a random-access memory (RAM), a read only memory, a flash memory, a volatile memory, a hard disk storage, or an optical medium. The at least one storage medium 202 coupled to the at least one processor 204 may be configured to store instructions and/or data. For example, the at least one storage medium 202 may be configured to store data collected by an IMU, computer executable instructions for implementing an abnormally-mounted propeller detection process, and/or the like.

The at least one processor 204 can include any suitable hardware processor, such as a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component. The at least one storage medium 202 stores computer program codes that, when executed by the at least one processor 204, control the at least one processor 204 and/or the at least one transceiver 206 to perform a method for detecting abnormally mounted propeller and/or a method for implementing safe operation logic consistent with the disclosure, such as one of the exemplary methods described below. In some embodiments, the computer program codes also control the at least one processor 204 to perform some or all of the functions that can be performed by the UAV and/or the remote control as described above, each of which can be an example of the computing device 200.

The at least one transceiver 206 is controlled by the at least one processor 204 to transmit data to and/or receive data from another device. The at least one transceiver 206 may include any number of transmitters and/or receivers suitable for wired and/or wireless communication.

The transceiver 206 may include one or more antennas for wireless communication at any supported frequency channel.

In some embodiments, the computing device 200 may further include a display. The display may include one or more screens for displaying contents in the computing device 200 or transmitted from another device, e.g., displaying a reminder note about one or more abnormally mounted propellers, displaying a graphical user interface requesting user input of flight control commands, etc. In some embodiments, the display may be a touchscreen display configured to receive touch inputs/gestures by a user. In some embodiments, the computing device 200 may include other I/O (input/output) devices, such as a joystick, a control panel, a speaker, an indicator light, etc. In operation, the computing device 200 may implement a method for detecting abnormally mounted propeller as disclosed herein.

Figure 3A:
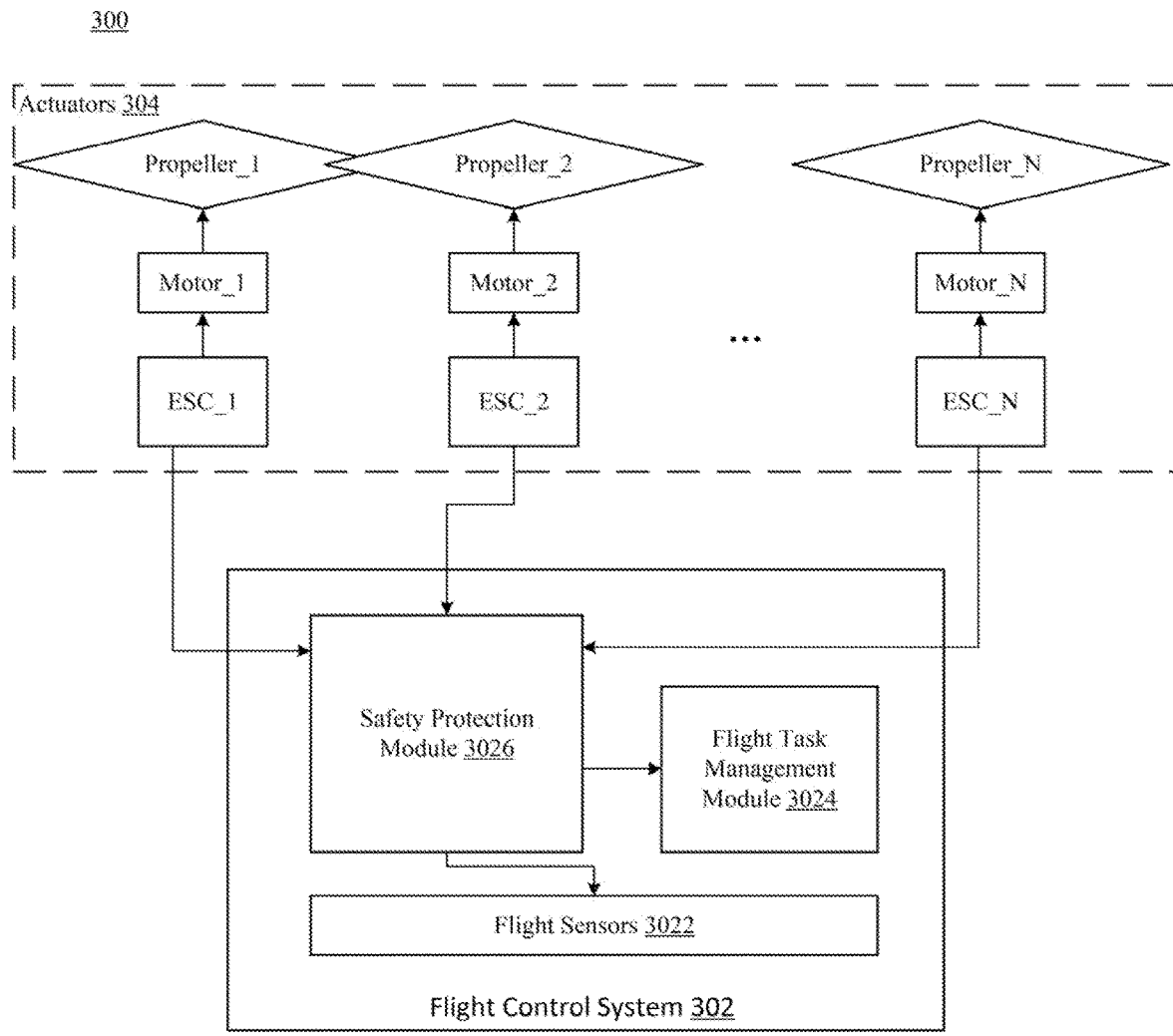
FIG. 3A is a schematic block diagram of another UAV according to an exemplary embodiment of the present disclosure.

FIG. 3A is a schematic block diagram of another UAV 300 according to an exemplary embodiment of the present disclosure. The UAV 300 may be the same as the UAV 100 shown in FIG. 1A and FIG. 1B. As shown in FIG. 3A, an exemplary UAV 300 may include a flight control system 302 and multiple actuators 304. The flight control system 302 may include flight sensors 3022, a flight task management module 3024, and a safety protection module 3026. The flight sensors 3022 may be at least part of the sensing system 102 shown in FIG. 1B. The flight sensors 3022 may include sensors such as IMU, compass, barometer, etc. The attitude and altitude information of the UAV can be obtained based on information collected by the flight sensors 3022. The flight task management module 3024 is configured to manage flight missions and flight status of the UAV, such as starting motors to operate at an idling speed when receiving an idling control signal, initiating a takeoff procedure when receiving a takeoff control signal, determining current flight status of the UAV (e.g., idling, taking off, in the air), etc. An idling speed, as used herein, refers to a motor speed that does not produce enough power for the UAV to ascend into the air when all propellers are correctly mounted. In some embodiments, the flight task management module 3024 can be implemented by controller 108 shown in FIG. 1B.

Each actuator 304 may include a motor, a propeller, and/or an electronic speed control (ESC). An actuator, as used herein, refers to a component responsible for moving the UAV such as making the UAV to takeoff, fly in the air, and landing. The actuators 304 may be at least part of the propulsion system 104 shown in FIG. 1B. The ESC is configured to receive a control signal/command from the flight control system 302 and control the speed of its corresponding motor based on the received control signal. The ESC can also monitor status information of the motor (e.g., the speed and current of the motor) and send the status information of the motor to the flight control system 302.

Figure 3B:
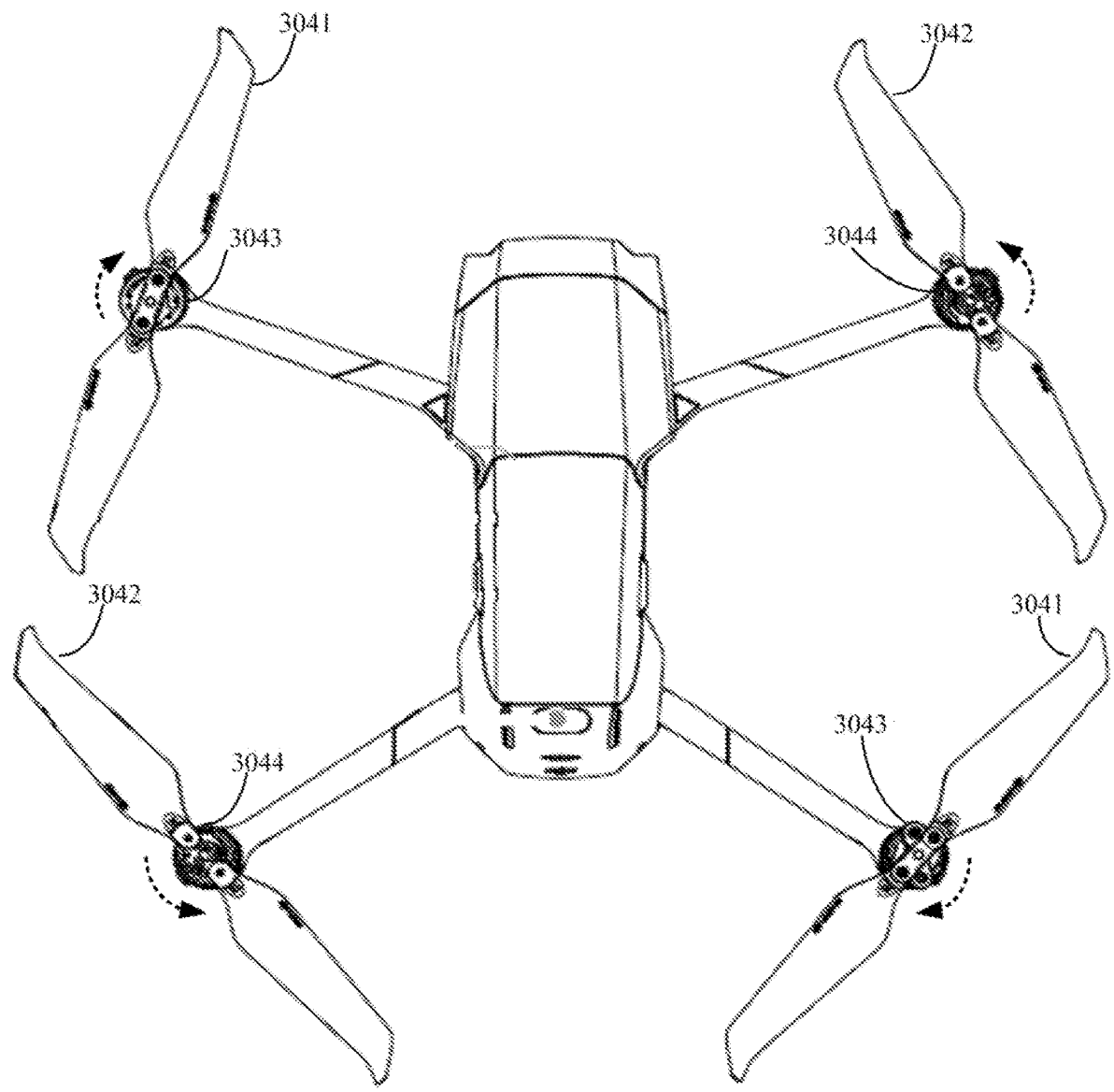
FIG. 3B is a schematic block diagram of another UAV according to an exemplary embodiment of the present disclosure.

FIG. 3B is a schematic block diagram of another UAV 300 according to an exemplary embodiment of the present disclosure. Each propeller is configured to be mounted on its corresponding motor and produce an upward thrust/force as the motor rotates. A clockwise-rotating propeller (e.g., propeller 3041) refers to a propeller designed to produce upward force when rotating in clockwise direction. Similarly, a counterclockwise-rotating propeller (e.g., propeller 3042) refers to a propeller designed to produce upward force when rotating in counterclockwise direction. Generally, to balance the torques of the actuators in a UAV, some motors (e.g., motor 3044) are configured to drive its corresponding propeller (e.g., propeller 3042) to rotate in counterclockwise direction, and some other motors (e.g., motor 3043) are configured to drive its corresponding propeller (e.g., propeller 3041) to rotate in clockwise direction. Usually a propeller is mounted on the UAV by rotating/tightening the propeller to a receiving structure on the UAV in an intended direction (e.g., clockwise or counter-clockwise). Mounted or tightened in an incorrect or a reverse direction, as used herein, may refer to the propeller being installed or tightened in a direction opposite to the intended direction. That is, a clockwise-rotating propeller is considered to be correctly secured/installed when being mounted on a motor that rotates clockwise. If the propeller is inversely mounted, i.e., the direction of rotation of the propeller and its corresponding motor is different, the propeller is considered to be incorrectly mounted, and its corresponding motor may drive the propeller to produce a downward force. Generally, motors located at symmetric positions have same rotation direction, and their propellers should be mounted with same rotation direction.

If all propellers are installed correctly based on their intended rotation directions, it is considered that the propeller installation mode is the normal mode. If part or all of the propellers are not installed, not securely/properly tightened, and/or not installed with intended rotation direction, it is considered that the propeller installation mode is abnormal mode. There are multiple occasions where a UAV has abnormally mounted propeller(s), including: (1) part of the propellers are not installed, which usually causes rollover of the UAV; (2) neighboring propellers are tightened in directions opposite to correct directions (i.e., neighboring propellers are reversely mounted propellers), which usually causes rollover of the UAV; (3) all propellers are installed in incorrect directions, or propellers located at symmetric positions are installed in incorrect directions, which usually causes slow spinning of the UAV and/or excessively fast whirling of the propellers.

Multi-rotor UAVs are prone to fail during take-off procedure due to an abnormality of one or more of its actuators 304. The possible reasons include: a user did not install the propeller(s) correctly, at least one propeller is damaged or broken, at least one propeller is not tightened enough and is thrown out when the motor starts operating; at least one ESC is functioning abnormally, at least one motor fails, the propeller(s) hitting an obstacle/object when rotating, etc. When the takeoff process fails, the UAV may rollover or spin and cause damage to the UAV itself and the user. Table 1 describes a plurality of damage levels possibly caused by abnormally mounted propeller(s). Damage level, as used herein, may be used to describe the extent of damage that a certain event poses on user safety or UAV safety.

TABLE 1

Possible damages caused by abnormally mounted propeller

| Damage level | Description of the damage | Damage to user | Damage to UAV |
|---|---|---|---|
| 1 | After receiving a takeoff command, the UAV does not takeoff, rolls over, spins around in the original place, | Impaired user experience | None |

TABLE 1-continued

Possible damages caused by abnormally mounted propeller

| Damage level | Description of the damage | Damage to user | Damage to UAV |
|---|---|---|---|
| | and/or the propeller(s) are whirling excessively fast. The user needs to re-install the propellers. | | |
| 2 | After receiving a takeoff command, the UAV does not takeoff, does not tip over, but is slightly spinning in the original position | Minor stress | None |
| 3 | After receiving a takeoff command, the UAV does not takeoff, does not tip over, but is quickly spinning in the original position or the propellers are whirling/rotating at an excessive speed | Relatively greater stress | stand of the UAV is slightly worn |
| 4 | After receiving a takeoff command, the UAV does not leave the ground, slowly rolls over at the original place, propellers do not have obvious signs of wear and tear | Relatively greater stress | Recoverable bending mark shown on the propeller, or the edges of the propeller is slightly worn |
| 5 | After receiving a takeoff command, the UAV does not leave the ground, quickly rolls over at the original place, propeller is broken. | Relatively greater stress | Broken propeller |
| 6 | After receiving a takeoff command, the UAV lifts off and rolls over in the air, or uncontrollably spinning in the air, flies out for certain distance, and falls after hitting an obstacle | Scratches | Broken propeller, gimbal damaged, structure damage. |

Without a foolproof plan to prevent users from mounting the propellers incorrectly, the damage levels are often level 4 to level 6. To prevent possible damages and reduce damage level caused by incorrectly mounted propellers, the disclosed UAV 300 further includes a safety protection module 3026 that implements a foolproof plan to prevent users from mounting the propellers incorrectly, activate safe mode before substantive damage occurs to the user or the UAV, reducing the damage level. The safety protection module 3026 can be configured to receive various information from other components of the UAV, such as receiving flight status information (e.g., task stage description information) from the flight task management module 3024, receiving sensor data from the flight sensors 2022, receiving information about the actuators 304 (e.g., speed and current of the motors) from the corresponding ESCs, etc. The safety protection module 3026 is further configured to monitor UAV safety based on the received information, determine whether the actuators 304 are operating abnormally based on the received information (e.g., determining whether a propeller is abnormally mounted), and timely implement protection strategies when detecting potential or incurred damages, especially when the UAV is idling and/or implementing a takeoff procedure. When detecting potential or incurred damages, the safety protection module 3026 is further configured to control the UAV to enter a safe mode, including: requesting the flight task management module to abort the current procedure (e.g., a takeoff procedure), terminating operation of the motors, and/or generating reminder information to be displayed at an interactive user interface (e.g., at the remote control 110). In some embodiments, the safety protection module 3026 can be implemented by controller 108 shown in FIG. 1B.

The safety protection module 3026 can be configured to implement a software foolproof plan, providing layers of protections to the takeoff process of the UAV. The protection plans may include, for example, detecting abnormal propeller mounting when the motors are activated and timely shutting down the UAV (e.g., turning off the motors); shutting down the UAV when the UAV fails to take off; when the UAV is about to roll over, immediately shutting down the UAV to minimize secondary damage; and when accidentally hitting an obstacle/object (e.g., causing stalled motors), or when a rollover event already occurs, immediately shutting down the UAV to minimize secondary damage. That is, the shutdown protection may occur upon detection of: abnormally mounted propeller at propeller initiation stage, failure to takeoff, rollover, and/or stalled motor.

In some embodiments, the propeller initiation process may include a self-tightening step. For example, when a controller of the UAV activates a motor corresponding to a propeller, two sequences of motor acceleration and deceleration are implemented, so that self-tightening propellers can be automatically tightened during the processes. When all propellers are correctly mounted, the UAV can stay steady during the propeller initiation process. When a part of propellers are not mounted, or when neighboring propellers are inversely mounted, the attitude of the UAV may change in correlation with the change of the motor speed variations. Accordingly, based on correlation between IMU attitude information and accelerator information (e.g., speed control signals directed to actuators 304), propeller mounting abnormality can be detected by the safety protection module 3026. Further, when a part of propellers are not mounted, information from ESC can indicate that there is no load at the corresponding motor, thereby determining propeller mounting abnormality, reducing damages to level 1.

In some embodiments, if a part of propellers are not mounted or neighboring propellers are inversely mounted, when the UAV is idling or about to takeoff, attitude information from the UAV can indicate a rollover inclination. In the early stage of tipping over, the safety protection module 3026 can request automatic shutdown, thereby reducing damages from level 6 to level 3-4.

In some embodiments, if propellers at symmetric positions or all propellers are inversely mounted, information from ESC and IMU may not be useful, and the UAV cannot successfully leave the ground when receiving a takeoff instruction. The safety protection module 3026 can detect abnormally mounted propellers if the UAV does not takeoff within a preset time period once a takeoff procedure is carried out.

Figure 4:
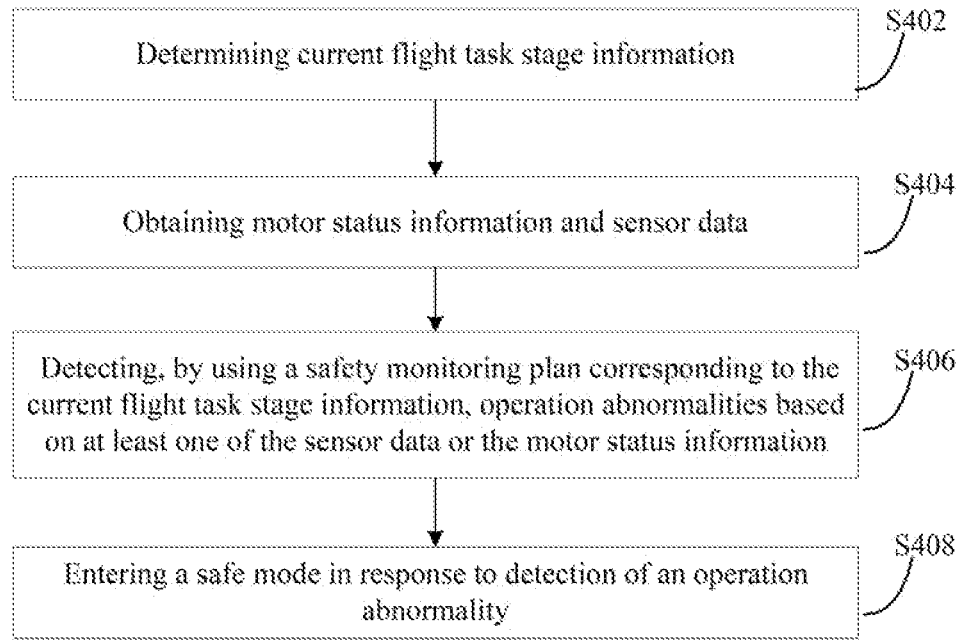
FIG. 4 is a flow chart illustrating a process of implementing safety protection measures in a UAV according to an exemplary embodiment of the present disclosure.

FIG. 4 is a flow chart illustrating a process 400 of implementing safety protection measures in a UAV according to an exemplary embodiment of the present disclosure. The process 400 can be implemented by UAV 100 shown in FIG. 1A and FIG. 1B and/or UAV 300 (e.g., the safety protection module 3026) shown in FIG. 3A.

As shown in FIG. 4, a current flight task stage information of the UAV is determined (S402). Different flight task stages may require different safety monitoring strategies/plans. In some embodiments, the flight task management module 3024 can send the flight task stage information to the safety protection module 3026.

Further, motor status information and sensor data can be collected (S404). In some embodiments, the motor status information of all motors may be sent by their corresponding ESCs to the safety protection module 3026. The motor status information may include motor speed and/or current running through the motor. The sensor data may be collected by the flight sensors 3022 such as an IMU and also sent to the safety protection module 3026. The sensor data may include attitude information and altitude information of the UAV.

A safety monitoring plan corresponding to the current flight task stage information can be used to detect operation abnormalities based on at least one of the sensor data or the motor status information (S406). The operation abnormalities may be caused by incorrectly mounted propeller(s) and other reasons, such as absence of the propeller of the actuator; incorrect installation of the propeller of the actuator; obstacle occurrence in a proximity of the propeller of the actuator; failure of the motor of the actuator; failure of the ESC of the actuator; false command from a control system of the UAV due to software issue; failure of one or more sensors of the UAV; or incorrect user operation. In addition, the propeller(s) can be incorrectly mounted in different ways. Accordingly, different types of operation abnormalities at different flight task stages. The UAV (e.g., the safety protection module 3026) may store multiple safety monitoring plans, each corresponding to a flight status stage.

For example, a takeoff procedure of a UAV can be divided into four stages: stage 1 being from the time when a command of initiating motors is received until the time when all motors are started; stage 2 being from the time when all motors are started until the time right before receiving a takeoff command (e.g., when the motors at an idling status); stage 3 being from the time when the takeoff command is received (e.g., from the remote control 110 or the flight task management module 3024) until the time right before the UAV leaves the ground (i.e., when the motors starts to accelerate until producing enough ascending power to lift the UAV from the ground, the speed being greater than the idling speed); stage 4 being from the time when the UAV leaves the ground until the UAV reaches a specified altitude. Accordingly, in this embodiment, the current flight task stage information determined in step S402 can be any one of the four stages. Further, safety monitoring plans corresponding to the four stages (hereinafter "the plan") may include the following.

At Stage 1: the plan includes performing self-diagnosis on components and functions related to takeoff task, and refusing to carry out the motor initiation command and entering safe mode if detecting any abnormalities. The components and function related to takeoff task may include status of the sensors and status of the ESC and motors.

The plan also includes monitoring motor initiating process, and when part or all of the motors starts up abnormally, entering safe mode. In one embodiment, a minimum speed is predefined for the motors. When the rotation/spinning speed of one or more motors are lower than the minimum speed, abnormality of motor startup is determined. Such abnormality may be caused by a propeller mounted on the abnormal motor hitting an object when the motor is operating. In another embodiment, a maximum speed is predefined for the motors. When the rotation/spinning speed of one or more motors is greater than the maximum speed, abnormality of motor start up is determined. Such abnormality may be caused by no propeller mounted on the abnormal motor and the motor is operating without load. In another embodiment, maximum current for ESC is predefined. When the current of one ESC is greater than the predefined maximum current, abnormality of motor start up is determined. Such abnormality may be caused by stalled motor.

The plan also includes monitoring global status information of the UAV, such as the attitude and altitude of the UAV, and when the global status is abnormal, entering the safe mode. For example, when the attitude of the UAV is not in a reasonable range and shows inclination of rollover; or when motors operate at high speeds and the UAV directly takes off without receiving a takeoff command, it is determined that the global status is abnormal.

At Stage 2: the plan may include self-diagnosing components and functions related to takeoff task, and shutting down the motors to enter a safe mode if detecting any abnormal status.

The plan also includes generating an excitation signal for the motors, monitoring status of the actuator and the whole UAV, entering the safe mode when abnormality occurs. The excitation signal may be understood as a sequence of instructions that follow specific rule/law. For example, the excitation signal can be a sequence of instructions having a sawtooth shape and can be input to the actuator. Under the influence of the excitation signal, the motor may undergo a slight acceleration and deceleration process without causing the UAV to ascend into the air. In some embodiments, the propeller initiation and self-tightening process may be implemented at Stage 2 (e.g., in response to the excitation signal).

By monitoring the status information of the motor and the global information of the UAV, abnormal mounting of propeller(s) may be detected. Specifically, as a normal response to the excitation signal, the speed of the motor should increase as the amplitude of the instruction increases, and decrease as the amplitude of the instruction decreases. When applied with the same excitation signal, operation information (e.g. speed and/or current) of motors that are in the same model should be similar and does not exceed certain threshold. During the acceleration and deceleration process, the attitude and/or speed of the UAV do not indicate an inclination of rollover. A correlation coefficient between the attitude of the UAV and the sequence of instructions for the motors is monitored. When the correlation coefficient exceeds a preset threshold, it is considered that the UAV exhibits an inclination to rollover. This method can be used to detect propellers that are mounted in directions opposite to expected/correct directions, and to detect unmounted propeller or broken propeller.

At Stage 3: the plan may include self-diagnosing components and functions related to takeoff task, and shutting down the motors to enter a safe mode if detecting any abnormal status. The plan may also include predefining a maximum takeoff duration; if the UAV fails to take off after the maximum takeoff duration has passed, aborting the takeoff procedure and entering safe mode. Such abnormality may be caused by all propellers being reversely mounted, or propellers located at symmetric positions being reversely mounted. The plan may also include monitoring whether the status of the UAV is consistent with the control commands, if not, entering the safe mode. For example, it is considered abnormal if a current attitude angle of the UAV exceeds a preset maximum angle, a current flight speed exceeds a preset maximum speed, an attitude angle variation rate exceeds a preset maximum attitude angle variation rate (e.g., the UAV may incline to tip over).

At Stage 4, the plan may include determining whether current status information of the UAV is within preset normal ranges, and if not, entering the safe mode. The preset normal ranges may include maximum attitude angle(s), maximum acceleration, maximum destination altitude. The plan may also include monitoring environmental factors of the UAV, and determining abnormality occurs when, for example, a wind intensity exceeds a maximum allowed wind intensity, a control margin of actuators exceeds a maximum control amount.

In response to detecting an operation abnormality, the UAV can enter a safe mode (S408). The safe mode may include aborting the current flight task procedure, shutting down the motors, and/or remind users about the abnormality through an interactive user interface.

The disclosed method makes full use of the task stage status information of the UAV, the information from the actuators and the sensor information of the UAV itself, comprehensively monitors whether the take-off process of the UAV is normal, and adopts a timely protection strategy for the potential or existing occurrence of take-off anomalies, thus enhancing user experience and reducing equipment loss/damage.

Figure 5:
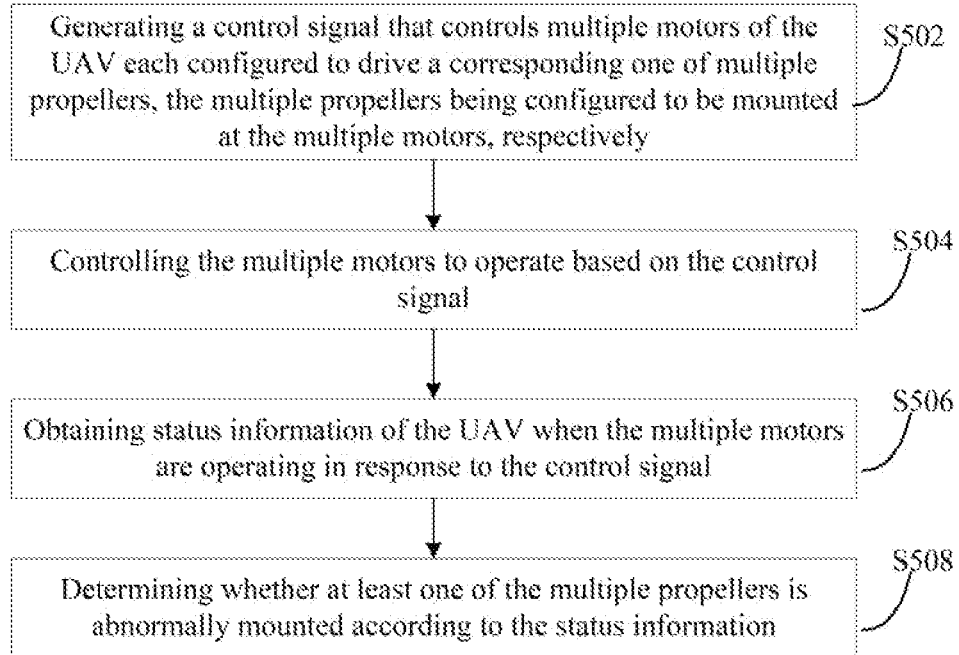
FIG. 5 is a flow chart illustrating a process of determining abnormally mounted propeller(s) according to an exemplary embodiment of the present disclosure.

FIG. 5 is a flow chart illustrating a process 500 of determining abnormally mounted propeller(s) according to an exemplary embodiment of the present disclosure. The process 500 can be implemented by UAV 100 shown in FIG. 1A and FIG. 1B and/or UAV 300 (e.g., the safety protection module 3026) shown in FIG. 3A.

As shown in FIG. 5, a control signal that controls multiple motors of the UAV can be generated (S502). Each of the multiple motors is configured to drive a corresponding one of multiple propellers. The multiple propellers are configured to be mounted at the multiple motors, respectively. The control signal may be generated before the UAV takes off. The control signal may include at least one of an idling control signal or a takeoff control signal. An idling control signal, as used herein, refers to a signal that controls the motors to rotate at a speed that does not produce enough power for the UAV to ascend into the air when all propellers are correctly mounted. The control signal is intended to provide an active excitation stimulus to the motors, and by analyzing the UAV's response to the stimulus, propeller mounting abnormality can be detected. In some embodiments, the control signal may be generated after a UAV activation instruction (e.g., initiating the motors to operate at an idling state) or a takeoff instruction is given by a remote control 110 based on user input. In some embodiments, the control signal may be generated at stage 2 of the takeoff procedure.

The multiple motors are controlled to operate based on the control signal (S504). In some embodiments, the multiple motors can be controlled to operate at a same speed. The speed may be a constant speed, such as an idling speed. Alternatively, the speed may be accelerated or decelerated based on amplitude of the control signal. In other words, the control signal may be configured to control each of the multiple motors to operate according to a same preset speed variation pattern, such as sequentially acceleration and deceleration. In some embodiments, the control signal may be a sawtooth wave signal or a triangle wave signal. In some embodiments, the control signal may control each motor to operate according to repeated sequences of acceleration and deceleration.

Further, status information of the UAV are obtained when the multiple motors are operating in response to the control signal (S506). The status information of the UAV may include, for example, speed information of the multiple motors, electrical current information of the multiple motors, attitude information of the UAV, altitude information of the UAV, location information of the UAV, etc. The status information of the UAV may be collected by various components of the UAV, such as IMU sensor, location sensor, ESCs of their corresponding motors, etc.

It can be determined whether at least one of the multiple propellers is abnormally mounted according to the status information (S508). In one embodiment, when the control signal controls each of the multiple motors to operate at a same constant speed (e.g., an idling speed), the speed information (e.g. received from multiple ESCs) of the motors may be compared with each other or compared with a preset threshold. When a speed of one of the multiple motors equals to or greater than a preset speed threshold, or when the speed of one of the multiple motors is significantly greater than the speed of other motors, it can be determined that the one motor is not mounted with a propeller (e.g., causing the motor to operate without load thus showing a higher speed).

In one embodiment, when the control signal controls each of the multiple motors to operate according to a preset speed variation pattern, the attitude variation (e.g., received from IMU) of the UAV being strongly correlated with the speed variation indicates that the UAV is inclined to roll over due to abnormally mounted propeller(s). Alternatively, the attitude variation of the UAV being greater than a preset variation threshold may also indicate abnormally mounted propeller(s). In some embodiments, the horizontal attitude angle may be pitch angle, yaw angle, roll angle, or a combination thereof.

Figure 6A:
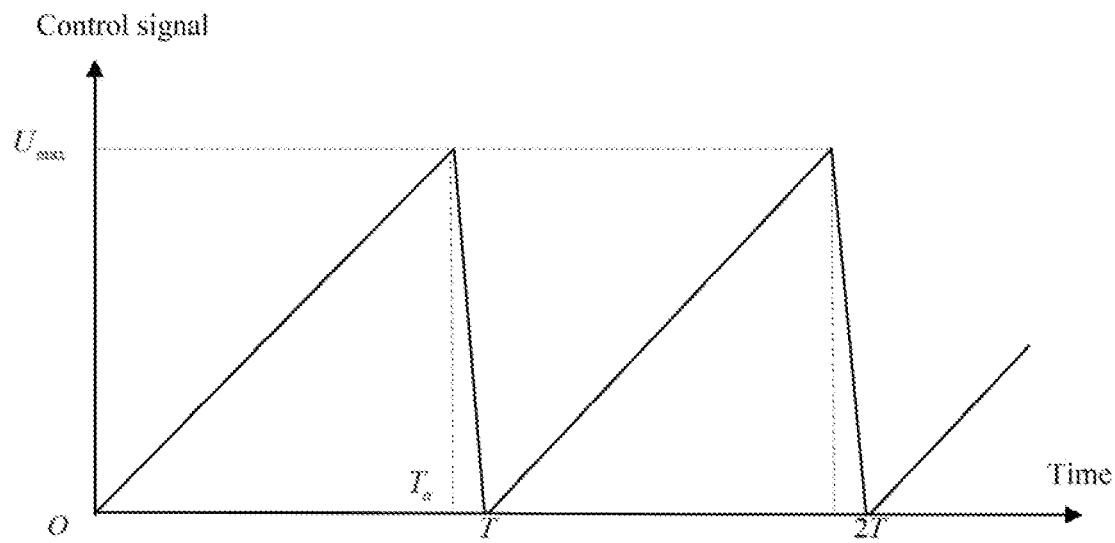
FIG. 6A illustrates a diagram of control signal variation over time according to an exemplary embodiment of the present disclosure.
Figure 6B:
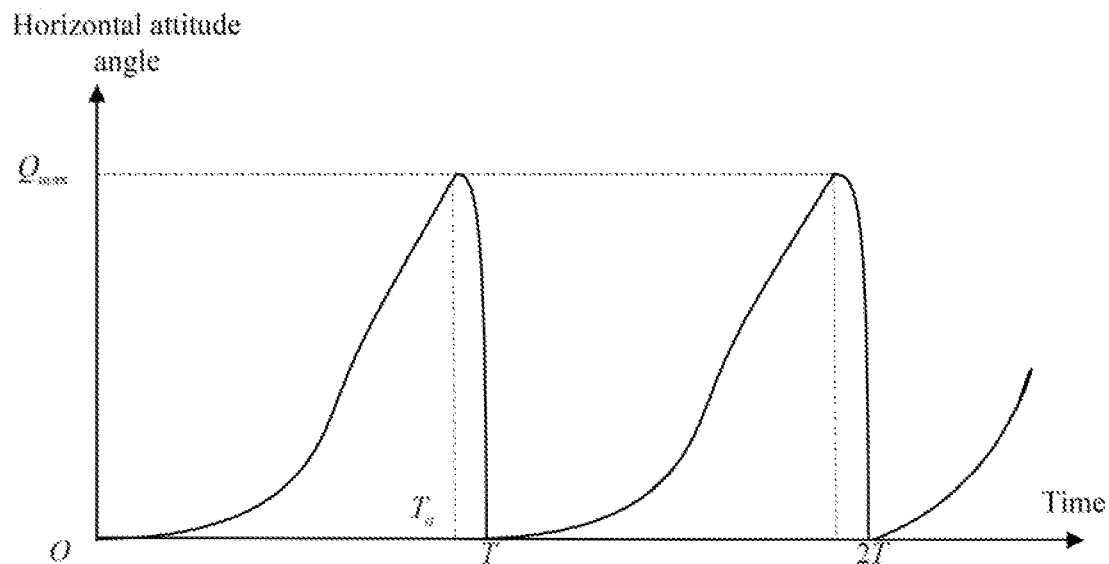
FIG. 6B illustrates a diagram of horizontal attitude angle variation over time correlated with the control signal shown in FIG. 6A when one or more propellers are abnormally mounted.

FIG. 6A illustrates a diagram of control signal variation over time according to an exemplary embodiment of the present disclosure. FIG. 6B illustrates a diagram of horizontal attitude angle variation over time correlated with the control signal shown in FIG. 6A when one or more propellers are abnormally mounted. At time moment $t_k$, the horizontal attitude angle of the UAV is denoted by $q_k$, the control signal directed to the motors is denoted by $u_k$, and the sum of horizontal torques outputted by all motors is denoted by $T_k$. $Q_k = \{q_{k-N+1}, q_{k-N+2}, \ldots, q_{k-1}, q_k\}$ denotes a sequence of horizontal attitude angles in the most recent N moments. $U_k = \{u_{k-N+1}, u_{k-N+2}, \ldots, u_{k-1}, u_k\}$ denotes a sequence of amplitudes of control signals directed to the motors in the most recent N moments. In a process of determining whether propeller(s) are abnormally mounted, the control signal (e.g., a sequence of excitation signals/instructions) can be sent to all motors simultaneously. In other words, at a same timestamp, the control signal sent to all the motors are the same. The control signal may include sequentially-increasing amplitudes followed by sequentially-decreasing amplitudes. As shown in FIG. 6A, the control signal (e.g., sample excitation signal output to the motors) starts at 0, $u_k$ gradually increases along the time axis and reaches a maximum amplitude at time $T_a$, then gradually decreases and reaches a minimum amplitude (e.g., 0) at time T. Such trend is repeated during next cycle. $U_{max}$ is smaller than the signal amplitude required for UAV ascending, to ensure the excitation and self-diagnosis process being performed while the UAV is on the ground and the UAV would not takeoff.

In some embodiments, the UAV is a quadcopter. According to the symmetrical characteristics of the quadcopter, when all propellers are normally mounted, if each motor receives a same control signal, the sum of their horizontal torque $T_k$ tends to be zero. In embodiments where the UAV is unsymmetrical, a control distribution algorithm can be utilized to calculate control signals suitable for each motor such that a theoretical value of the sum of horizontal torques generated by all motors is zero. Accordingly, the UAV would not tend to roll over when all propellers are mounted correctly. However, if one or more propellers are incorrectly mounted (such as a counterclockwise rotating propeller mounted on a clockwise rotating motor or a motor is not mounted with a propeller), the combined horizontal torques generated by the motors under the control of the excitation signal would no longer tend to become zero. When the combined horizontal torque is large enough, the UAV may show obvious shaking motion according to the control signal, i.e., the horizontal attitude angle of the UAV has obvious fluctuation according to the excitation signal, theoretically as shown in FIG. 6B. When the correlation between the horizontal attitude and the control signal is substantively greater than a regular setting, it can be determined that one or more propellers are abnormally mounted.

Based on the above analysis, in some embodiments, before the UAV takes off, excitation control signals for all the motors having a pattern as shown in FIG. 6A can be generated. A chronical sequence of the control signal at most recent N moments $U_k$ is recorded. Most recent N recordings of horizontal attitude information form a chronical sequence of horizontal attitude information $Q_k$. Variance of $Q_k$ is calculated and denoted as $D(Q_k)$, and variance of $U_k$ is calculated and denoted as $D(U_k)$. Optionally, $D(U_k)$ is verified to be greater than a preset variance threshold, to ensure that the control signal (i.e., series of excitation signals) are generated successfully. $D(Q_k)$ is compared with a variance threshold. $D(Q_k)$ being greater than a variance threshold indicates that the horizontal attitude of the UAV varies greatly and the UAV exhibits obvious shaking activities.

Further, a covariance between the control signal sequence $U_k$ and the horizontal attitude angle sequence $Q_k$ is denoted as COV $(Q_k, U_k)$. A correlation coefficient $\rho_k$ between the variance of the control signal sequence and the variance of the horizontal attitude angle sequence can be calculated as:

$$\rho_k = \frac{COV(Q_k, U_k)}{\sqrt{D(Q_k)} \sqrt{D(U_k)}}$$

If $\rho_k$ is greater than a preset coefficient threshold, it is determined that the shaking or rocking of the UAV has strong correlation to the excitation signals, indicating incorrectly mounted propeller(s).

It can be understood that the correlation coefficient $\rho_k$ can be obtained from calculating other types of transformation of the excitation signals $Q_k$ and the horizontal attitude angles $U_k$, i.e., $f(Q_k)$ and $g(U_k)$, and the mounting correctness of propellers can be obtained by determining whether the correlation coefficient is greater than a corresponding threshold.

Figure 7A:
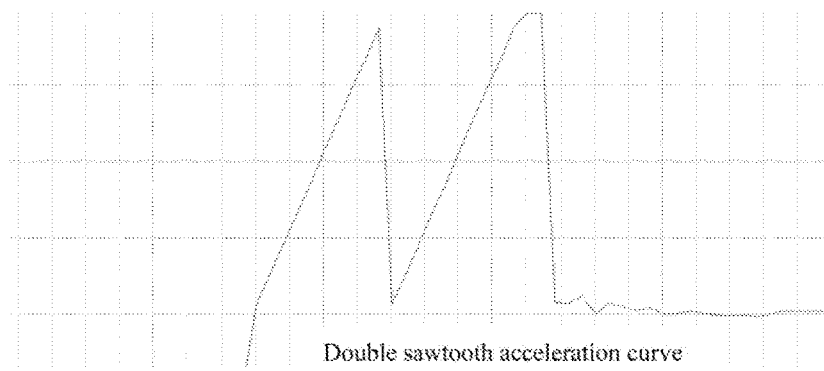
FIG. 7A illustrates a diagram of control signal variation over time recorded in an experiment according to an exemplary embodiment of the present disclosure.
Figure 7B:
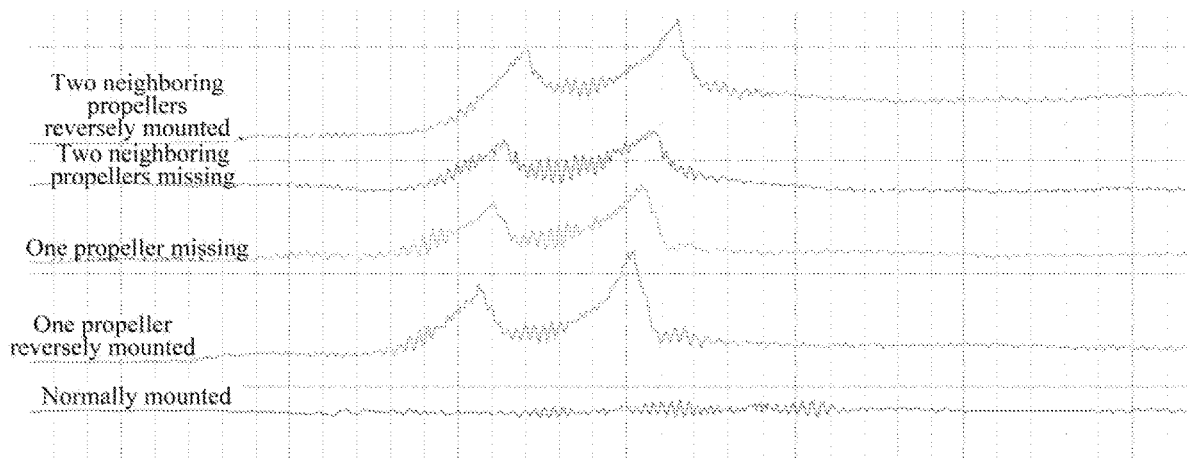
FIG. 7B show experimental results illustrating horizontal attitude angle changes over time under multiple propeller mounting situations in response to the control signal shown in FIG. 7A.

FIG. 7A illustrates a diagram of control signal variation over time recorded in an experiment according to an exemplary embodiment of the present disclosure. FIG. 7B are experimental results illustrating horizontal attitude angle changes over time under multiple propeller mounting situations in response to the control signal shown in FIG. 7A. As shown in FIG. 7B, five curves showing horizontal attitude changes along time (x-axis) are drawn at a same vertical scale. The five curves respectively representing, from top to bottom, horizontal attitude changes over time in response to the same excitation signals when: two neighboring propellers both reversely mounted, two neighboring motors both without mounted propellers, one motor without mounted propeller, one motor reversely mounted with a propeller, and all propellers correctly mounted. Clearly, when all propellers are correctly mounted, the horizontal attitude is steady and does not have significant changes overtime. When one or more propellers is not correctly mounted, the horizontal attitude are strongly correlated with the amplitude change of the excitation signals. Thus, by evaluating the attitude information (e.g., collected by the IMU of the UAV) and correlation between the attitude information and the excitation signal, abnormal mounting of propeller(s) can be timely recognized before the UAV takes off.

In one embodiment, when the control signal controls each of the multiple motors to accelerate to a same speed (e.g., the speed required to takeoff), the status information of the UAV (e.g., altitude information, location information) can indicate whether the UAV has successfully taken off. When the UAV has failed in taking off (e.g., the altitude or the location stays the same after preset duration), determining that the propeller is abnormally mounted. When no abnormality is detected when the motors are operating at idling speed but the UAV fails to takeoff, this phenomenon may indicate incorrect propeller mounting orientation at motors located at symmetric positions, or incorrect propeller mounting orientation at all of the multiple motors.

The disclosed method integrates information of actuators, information of the flight sensors and information of the flight task management module, and establishes a complete protection logic to further improve the safety of the UAV, especially during the take-off process. By exciting the motors before the UAV has taken off, the monitoring process becomes an active process instead of a passive process, and a more comprehensive actuator monitoring can be achieved. Based on the state of the ESC and the state of the whole machine, abnormal propeller mounting can be timely detected before causing further damages. The safety protection module can, unlike single ESC that only monitors status of its own motor, be configured to compare the information of all ESCs. With the comprehensive information from all ESCs, the safety protection module can implement difference detection among different ESCs and motors, which further improves the safety protection. In other words, abnormal state of the actuator can be detected by evaluating the difference between the feedback information of the ESC. Status information (flight stage, attitude, altitude, etc.) of the UAV are also utilized to evaluate rollover inclination of the UAV, further enhancing UAV operation safety. Different plans of actuator monitoring and protection strategies are set based on flight stage information during the takeoff process.

The disclosed method and device provides an overall protection scheme that are particularly useful for UAVs without component protection functions (such as ESC self-detection function, mechanical foolproof mechanism for propeller mounting, etc.). Additionally, the disclosed method and device can also provide protection against take-off failure caused by non-actuator factors, such as energy loss reasons, sensor failures, etc.

The processes shown in the figures associated with the method embodiments can be executed or performed in any suitable order or sequence, which is not limited to the order and sequence shown in the figures and described above. For example, two consecutive processes may be executed substantially simultaneously where appropriate or in parallel to reduce latency and processing time, or be executed in an order reversed to that shown in the figures, depending on the functionality involved.

Further, the components in the figures associated with the device embodiments can be coupled in a manner different from that shown in the figures as needed. Some components may be omitted and additional components may be added.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

What is claimed is:

1. A method for an unmanned aerial vehicle (UAV) comprising:
   generating a control signal that controls multiple motors of the UAV each configured to drive a corresponding one of multiple propellers, the multiple propellers being configured to be mounted at the multiple motors, and the control signal including at least one of an idling control signal or a takeoff control signal;
   controlling the multiple motors to operate based on the control signal;
   obtaining status information of the UAV when the multiple motors are operating in response to the control signal; and
   determining whether at least one of the multiple propellers is abnormally mounted according to the status information.

2. The method of claim 1, further comprising:
   in response to determining that at least one of the multiple propellers is abnormally mounted, generating and outputting a mounting abnormality notice.

3. The method of claim 2, wherein outputting the mounting abnormality notice comprises:
   sending the mounting abnormality notice to a control terminal for presentation, the control terminal being connected to the UAV.

4. The method of claim 1, further comprising:
   in response to determining that at least one of the multiple propellers is abnormally mounted, terminating operation of the multiple motors.

5. The method of claim 1, wherein:
   the control signal is configured to drive the multiple motors to operate at a same speed.

6. The method of claim 1, wherein:
   the status information of the UAV comprises at least one of: speed information of the multiple motors, electrical current information of the multiple motors, attitude information of the UAV, altitude information of the UAV, or location information of the UAV.

7. The method of claim 1, wherein the propeller being abnormally mounted includes at least one of:
   absence of propeller at one or more of the multiple motors, incorrect propeller mounting orientation at part of the multiple motors, or incorrect propeller mounting orientation at all of the multiple motors.

8. The method of claim 1, wherein:
   the control signal includes a first idling control signal that controls each of the multiple motors to operate at a constant speed;
   the status information comprises speed information of the multiple motors; and
   determining whether at least one of the multiple propellers is abnormally mounted comprises: determining whether at least one of the multiple propellers is abnormally mounted according to the speed information of the multiple motors.

9. The method of claim 8, wherein determining whether at least one of the multiple propellers is abnormally mounted comprises:
   in response to determining that a speed of one of the multiple motors equals to or greater than a preset speed threshold, determining that the one of the multiple motors is not mounted with a propeller.

10. The method of claim 1, wherein:
    the control signal includes a second idling control signal that controls each of the multiple motors to operate according to a preset speed variation pattern;
    the status information comprises attitude information of the UAV; and
    determining whether at least one of the multiple propellers is abnormally mounted comprises: determining whether at least one of the multiple propellers is abnormally mounted according to the attitude information of the UAV.

11. The method of claim 10, wherein:
    the preset speed variation pattern includes a sequence of acceleration and deceleration.

12. The method of claim 11, wherein:
    the second idling control signal includes at least one of: a sawtooth wave signal or a triangle wave signal.

13. The method of claim 10, wherein determining whether at least one of the multiple propellers is abnormally mounted comprises:
    determining a correlation coefficient between the attitude information and the second idling control signal; and
    when the correlation coefficient is greater than a preset coefficient threshold, determining that at least one of the multiple propellers is abnormally mounted.

14. The method of claim 10, wherein determining whether at least one of the multiple propellers is abnormally mounted comprises:
    determining an attitude variation of the UAV according to the attitude information collected when the multiple motors are operating in response to the second idling control signal; and
    when the attitude variation of the UAV is greater than a preset variation threshold, determining that at least one of the multiple propellers is abnormally mounted.

15. The method of claim 10, wherein the propeller being abnormally mounted includes at least one of:
    absence of propeller at one or more of the multiple motors, or incorrect propeller mounting orientation at part of the multiple motors.

16. The method of claim 1, wherein the control signal includes the takeoff control signal, and determining whether at least one of the multiple propellers is abnormally mounted comprises:
    determining whether the UAV has successfully taken off according to the status information; and
    in response to determining that the UAV has failed in taking off, determining that at least one of the multiple propellers is abnormally mounted.

17. The method of claim 16, wherein the propeller being abnormally mounted includes at least one of:
    incorrect propeller mounting orientation at motors located at symmetric positions, or incorrect propeller mounting orientation at all of the multiple motors.

18. The method of claim 16, wherein the status information of the UAV includes at least one of: altitude information of the UAV, or location information of the UAV.

19. The method of claim 16, wherein determining whether the UAV has successfully taken off comprises:
    determining whether the UAV has successfully taken off within a preset time period according to the status information.

20. An apparatus for an unmanned aerial vehicle (UAV) comprising:
- a memory; and
- a processor coupled to the memory and configured to:
- generate a control signal that controls multiple motors of the UAV each configured to drive a corresponding one of multiple propellers, the multiple propellers being configured to be mounted at the multiple motors, and the control signal including at least one of an idling control signal or a takeoff control signal;
- control the multiple motors to operate based on the control signal;
- obtain status information of the UAV when the multiple motors are operating in response to the control signal; and
- determine whether at least one of the multiple propellers is abnormally mounted according to the status information.

\* \* \* \* \*